United States Patent [19]

Tamura et al.

[11] Patent Number: 4,849,151
[45] Date of Patent: Jul. 18, 1989

[54] METHOD OF MOLDING PLASTIC AND INJECTION COMPRESSION MOLDING APPARATUS USING ELONGATABLE TIE BARS

[75] Inventors: Toru Tamura, Ikeda; Masaaki Sunohara, Hirakata; Akio Ito, Katano; Yoshio Nakatani, Toyonaka, all of Japan

[73] Assignee: Matsushita Electric Industrial Co., Ltd., Osaka, Japan

[21] Appl. No.: 132,885

[22] Filed: Dec. 9, 1987

[30] Foreign Application Priority Data

Dec. 19, 1986 [JP] Japan .................................. 61-304158
Jan. 8, 1987 [JP] Japan ...................................... 62-2379

[51] Int. Cl.$^4$ ............................................. B29C 45/64
[52] U.S. Cl. .................................. 264/294; 264/328.1; 425/150; 425/450.1; 425/451.9; 425/589; 425/595
[58] Field of Search ................... 264/294, 328.1, 328.7, 264/328.8, 328.11; 425/150, 149, 214, 406, 450.1, 451.2, 451.9, 589, 590, 595

[56] References Cited

U.S. PATENT DOCUMENTS 4,519,763  5/1985  Matsuda et al. ................. 425/451.9

FOREIGN PATENT DOCUMENTS 1807006  5/1970  Fed. Rep. of Germany ...... 425/589
1079286  8/1967  United Kingdom ................ 425/589

*Primary Examiner*—Jan H. Silbaugh
*Assistant Examiner*—Jill L. Heitbrink
*Attorney, Agent, or Firm*—Wenderoth, Lind & Ponack

[57] ABSTRACT

A method of molding a plastic is initiated by injecting molten resin into a mold at a high pressure. The energy of the high pressure is partially stored in the form of elongation of tie bars of a molding machine. After the gate seals completely, the restoring force of the tie bars due to elastic deformation acts on the molded article as the mold article cools down. Each tie bar comprises a first member having a small modulus of elasticity and a second member. When the elongation of each tie bar is small, only the first member of small modulus of elasticity works. After the elongation reaches a certain amount of $\Delta l_1$, the two members are connected parallel. As a result, the apparent modulus of elasticity of each tie bar increases rapidly. This makes it possible to mold a plastic with high dimensional accuracy.

12 Claims, 2 Drawing Sheets

METHOD OF MOLDING PLASTIC AND INJECTION COMPRESSION MOLDING APPARATUS USING ELONGATABLE TIE BARS

BACKGROUND OF THE INVENTION

1. Field of the Invention

The present invention relates to a method of quite accurately molding plastics and to an injection compression molding machine for molding plastics with high dimensional accuracy.

2. Description of the Prior Art

In recent years, plastics have been molded by injection molding with high dimensional accuracy. For example, it has been required that lenses, optical disk substrates, etc. be molded to tolerances of submicron order.

For molding an article accurately, it has been the common practice to adopt the following process. First, a mold is clamped by applying a high pressure. Then, a molten resin is injected into the cavity of the mold through a nozzle. Immediately after the cavity is filled with the resin, a holding force large enough to prevent the mold from opening is imparted to the mold so that the shape of the molded product becomes as close as possible to the shape of the mold. The molding force is set less than the clamping force. As the specific volume of the molten resin in the mold is made closer to the specific volume of the resin at room temperature by adjusting the pressure and the temperature, sink marks, or shrink marks, which are produced on the molded product during cooling are reduced. In practice, however, a very large force is needed to satisfy such requirement. Under high pressure conditions, the mold and the construction elements of the molding machine including tie bars must be sufficiently rigid to prevent them from deforming. For this purpose, the mold and the molding machine are rendered bulky. This frequently results in a very large molding system.

SUMMARY OF THE INVENTION

It is an object of the present invention to provide a method of molding plastics with high dimensional accuracy.

It is another object of the invention to provide an injection compression molding apparatus which is simple in structure and capable of molding plastics highly reliably, stably, and accurately.

The inventive concept differs entirely from the prior art techniques in that the molding apparatus has portions which are quite low in rigidity. Specifically, tie bars of the injection molding apparatus is so structured as to yield to a high pressure of the injected plastic material immediately before completion of injection and elongate by a specific length that can be estimated by a relation between the volumetric coefficient of contraction of the plastic material and the volume of the cavity. The mold is thus allowed to open the cavity slightly by the pressure of the injected material. In practice, the plastic material is molded in such a way that, as the molded material cools down, the restoring force of the elongated tie bars due to elastic deformation acts in the direction of reducing the cavity, taking into consideration the length, thickness and modulus of elasticity of the material of the tie bars. The energy of the high pressure generated during the injection is stored in the form of elongation of the tie bars. In other words, after the gate of the mold has completely sealed, the molded material cools and, at the same time, the tie bars which were stretched in the direction of the thickness of the molded product are allowed to exert a restoring force due to elastic deformation. The volumetric coefficient of contraction of a plastic material can be calculated in advance from an equation of states of pressure, temperature and specific volume, generally known as a P-V-T curve.

The method according to the invention is a kind of injection compression molding. This method is characterized in that the physical deformation of the tie bars is utilized as the source of a compressing force and, therefore, as the molten resin in the mold cools, the tie bars quickly respond to the contraction of the resin and contract. Consequently, the shape of the mold can be accurately transferred to the molded product.

In a preferred example of the injection compression molding apparatus, each tie bar comprises a first member having a small modulus of elasticity and a second member having a larger modulus of elasticity than that of the first member. In this dual structure, when the amount of elongation is small, only the first member having the small modulus of elasticity works. When the amount of elongation reaches a specific amount $\Delta l_1$, the two members are connected parallel. Thus, the modulus of elasticity increases quickly. The energy of the high pressure applied to the mold cavity by the injection unit during injection is stored in the form of an elongation $\Delta L$ of the tie bars each being in the state that the two members are connected parallel. As the molten resin in the mold cools and solidifies, it contracts. At this time, the tie bars having been stretched by $\Delta L$ exert a compressing force on the resin in the mold.

DESCRIPTION OF THE PREFERRED EMBODIMENT

Figure 1:
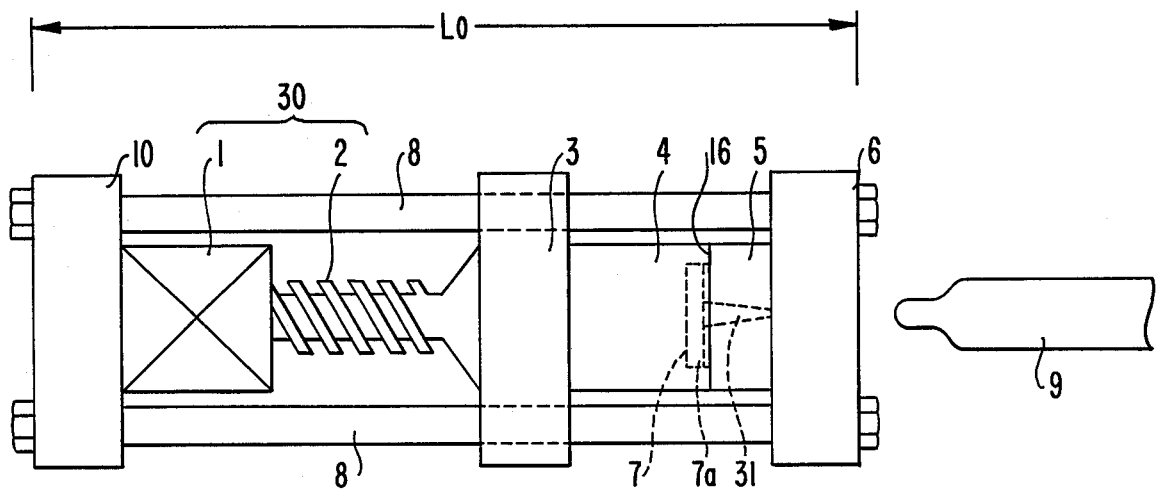
FIG. 1 is a schematic side view of an injection molding apparatus according to the invention.

Referring to FIG. 1, there is shown an injection compression molding apparatus embodying the concept of the present invention. This machine comprises a hydraulic cylinder 1 and a clamp screw 2 constructing a clamp unit 30, a movable platen 3, a front stationary platen 6, a rear stationary platen 10, a movable mold 4 and a stationary mold 5 forming therebetween a cavity 7, tie bars 8 (there are four tie bars) and an injection nozzle 9. A plastic resin that is molten by heat is injected through the nozzle 9 into the cavity 7 under high pressure to mold a disk 7a.

The clamp unit 30 is fixed to the rear stationary platen 10 supported at each of its four corners by one end of each tie bar 8. The front stationary platen 6 is supported at each of its four corners by the other end of each tie bar 8. The stationary mold 5 is fixed to the front stationary platen 6. The movable mold 4 is fixed to the movable platen 3 so as to be movable with a movement of the movable platen 3. For closing the pair of molds 4, 5, the clamp unit 30 pushes the movable platen 3 forward toward the front stationary platen 6 while the movable platen 3 is being guided by the tie bars 8 to move the movable mold 4 until parting surfaces 16 of the molds 4, 5 contact each other. At this time, each of the tie bars 8 is stretched by a specific length $\Delta l_1$ (entire length becomes $L_0$) so that the parting surfaces 16 of the molds 4, 5 are accurately in contact with each other. In general, since there remains a positioning error of the order of several ten microns even if the relative positions of the platens 3 and 6 are carefully adjusted, the platens 3 and 6 are not accurately in parallel to each other, and thus the parting surfaces of the molds 4 and 5 are not accurately in parallel to each other. Therefore, if the tie bars are rigid, the movable mold 4 cannot move further toward the stationary mold 5 after a part of the parting surface of the movable mold 4 has contacted a part of the parting surface of the stationary mold 5. This means that the molding surfaces of the molds 4 and 5 stay out of accurate parallelism to each other. However, since each of the tie bars 8 of the invention has a small modulus of elasticity until elongated by the specific length $\Delta l_1$, each tie bar yields to the force of the clamp unit 30 to elongate by $\Delta l.1$ The specific elongation length $\Delta l_1$ of each of the tie bars is so selected that the parting surfaces 16 of the molds 4 and 5 are in contact at their entire surfaces with each other when the tie bars 8 are elongated by their respective specific elongation lengths $\Delta l_1$. Accordingly, the molding surfaces of the molds 4 and 5 become accurately parallel to each other.

Figure 4:
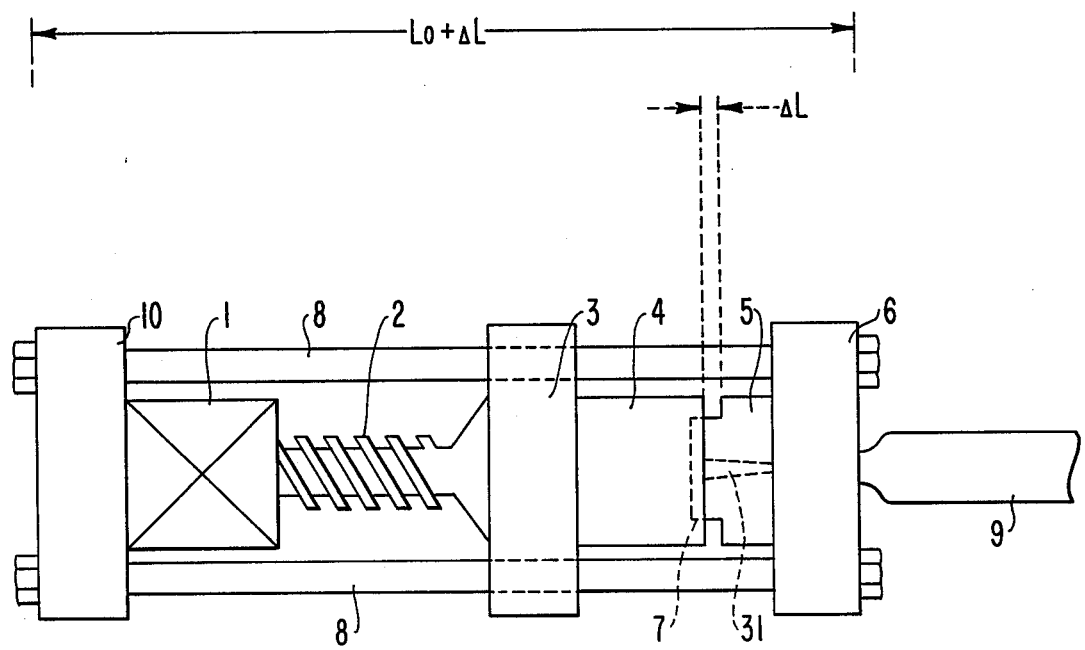
FIG. 4 is a view showing that the mold of the apparatus in FIG. 1 has been slightly opened by the secondary pressure of the molten resin in the cavity.

After the parting surfaces 16 of the molds 4 and 5 are completely in contact with each other in the way as described above, the nozzle 9 injects a molten resin into the cavity 7 at a high pressure. At this time, the tie bars 8 are further stretched by a length $\Delta L$ of the order of 35 microns due to the high pressure. As a result, the parting surfaces of the mold halves are parted by $\Delta L$ as shown in FIG. 4. Each of the tie bars 8 is structured such that its modulus of elasticity changes to a large value when its elongation has exceeded the length $\Delta l_1$. Thus, each tie bar further stretched by $\Delta L$ from $\Delta l_1$ produces a restoring force exerted as a compressing force on the resin in the cavity 7. Immediately after the injection of resin has been completed, the resin in a gate 31 of the stationary mold 5 cools to be solidified thereby to seal the gate 31. After the gate seal has been completed, the resin in the cavity 7 cools while being subjected to the compressing force caused by the tie bars 8. Therefore, the final molded product has a shape accurately identical to a shape defined by the molding surfaces of the molds 4 and 5.

Figure 2:
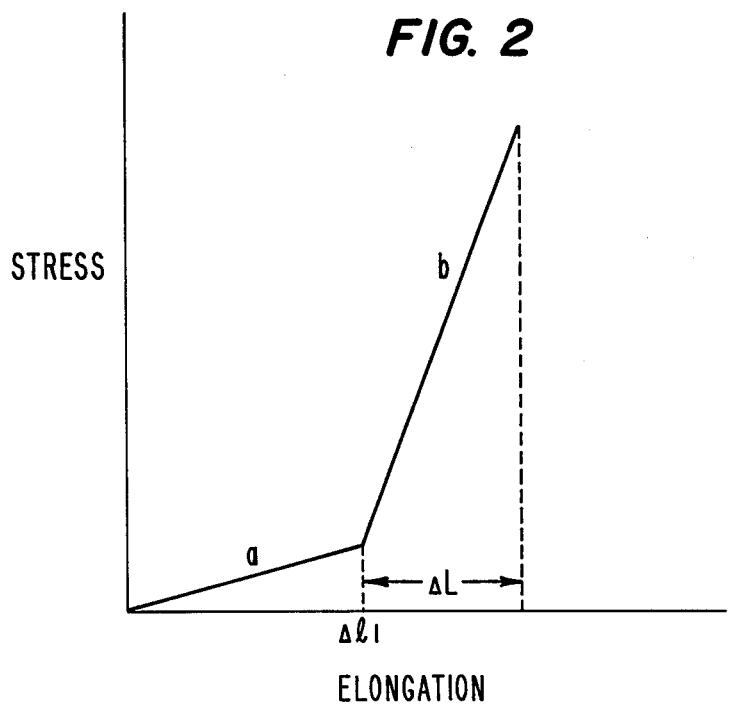
FIG. 2 is a graph for illustrating a relation between stress applied to the tie bars of the apparatus of the invention and elongation of the tie bars.

FIG. 2 shows a relation between elongation of each tie bar and stress applied thereto. The tie bar is stretched by a small stress along a line a until elongated by the length $\Delta l_1$, but is required to be given a large stress after the elongated length exceeds $\Delta l_1$ as shown by a line b. In other words, the elongation-stress characteristic curve suddenly becomes fairly steep when the elongation exceeds the specific length $\Delta L_1$. The tie bar is elongated along the line a by the force of the clamp unit until the elongation reaches $\Delta l_1$, when the parting surfaces of the movable and stationary molds become completely in contact with each other (primary clamping step), and is further elongated along the line b by the high pressure of the injected resin until the further elongation reaches $\Delta L$. It would be ideal if a material having such a characteristic as shown in FIG. 2 were available. But, there exists no such material. Thus, as a preferable structure, each tie bar is made to have a dual structure as, for example, shown in FIG. 3.

Figure 3:
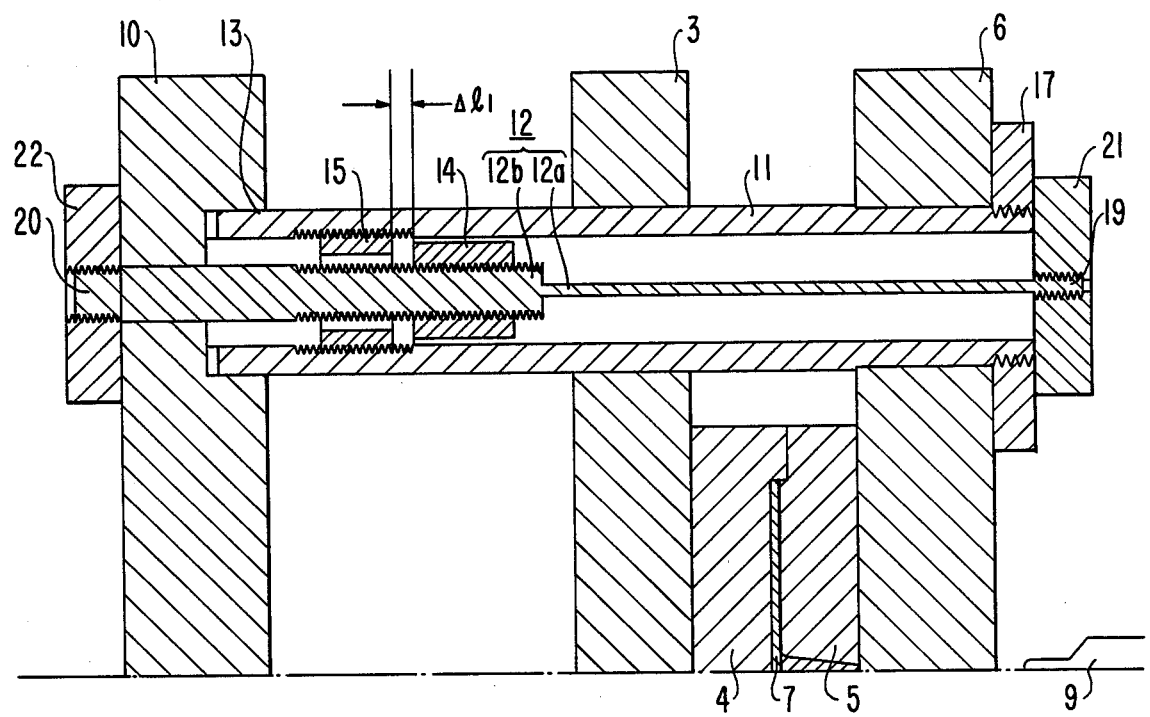
FIG. 3 is a sectional view of one of the four tie bars incorporated in the apparatus shown in FIG. 1.

Referring to FIG. 3, each tie bar comprises a member 12 having a small modulus of elasticity and a second member 11 having a large modulus of elasticity. The member 11 is hollow cylindrical in shape, and fixed at one end to the front stationary platen 6 with a mounting nut 17. The other end 13 of the member 11 is not fixed but is loosely fitted to the rear stationary platen 10 at a free end. The member 12 which is inserted in the hollow inside of the hollow cylindrical member 11 consists of two portions 12a and 12b joined together. These two portions 12a and 12b have different thicknesses from each other. The end 19 of the thinner portion 12a is fixed to the front stationary platen 6 with a nut 21. The end 20 of the thicker portion 12b is fixed to the rear stationary platen 10 with a nut 22. The modulus of elasticity of the thinner portion 12a is smaller than that of the member 11. Preferably, the thicker portion 12b has a modulus of elasticity equal to or larger than the modulus of elasticity of the member 11. After the elongation of the member 12 has reached $\Delta l_1$, the two members 11 and 12 are connected parallel by abutment of nuts 15 and 14 mounted on the members 11 and 12, respectively, so that the apparent modulus of elasticity of the tie bar increases suddenly. The value $\Delta l_1$ can be set by adjusting the gap $\Delta l_1$ between the adjusting nuts 14 and 15. The nut 14 is mounted on the thicker portion 12b of the inner member 12, while the nut 15 is mounted on the inner wall of the outer member 11.

FIG. 4 shows the state in which the parting surfaces 16 of the molds 4 and 5 are separated by a distance $\Delta L$ apart after the injection nozzle 9 has injected resin into the cavity 7, when each of the tie bars 8 has elongated by $\Delta L$ further from the $\Delta l_1$ elongated state. As the resin in the cavity cools, the deformation (elongation) of each tie bar decreases so that $\Delta L$ approaches zero. As a result, accurate injection compression molding can be achieved.

In the novel molding apparatus of the invention, each tie bar comprises two members that differ from each other in modulus of elasticity. During the primary clamping step of closing of the mold, the member having the smaller modulus of elasticity stretches within the region a of the stress-elongation characteristic line shown in FIG. 2. Therefore, even if the four tie bars stretch by different amounts during the closure of the mold, the stress, or the compressing force, does not differ greatly among the four bars. For this reason, the pressures applied by the four bars are substantially the same. Hence, substantially identical pressures are applied to the platens at the four corners when the mold is closed.

After the cavity of the mold has been filled with the resin, the opening force produced by the injection pressure inside the cavity opens the mold. During this process, the stress-elongation characteristic line of each of the tie bars goes into the region b shown in FIG. 2. At this time, a large amount of stress can be stored even if the elongation is small. That is, the energy of the elongation stored in the tie bar members having the larger modulus of elasticity is released as a force that compresses the resin in the cavity after the completion of the injection. Thus, an ideal compression molding can be attained, because the compressing force acts on the resin inside the mold as soon as the injection is completed. Strictly, when the compression stroke starts, the force applied to the resin is equal to the pressure divided by a factor which depends on the modulus of elasticity of the tie bars.

Generally, the platens of a molding apparatus are not expected to exhibit a high degree of parallelism as described before. Usually, a deviation of tens of microns from the parallelism occurs even if an adjustment is made most carefully. Therefore, where the molten resin is compressed by the elongation of the tie bars after the injection is complete, the four tie bars must stretch by the same length. Then, compressing forces of the same magnitude must act on the four corners of the bars; otherwise the mold could not be compressed while keeping the parallelism.

In view of the foregoing, the invention has been made. The novel molding apparatus, schematically shown in FIG. 1, is characterized in that each tie bar 8 has a dual structure comprising the outer member 11 and the inner member 12 (FIG. 3).

The primary clamping step of mold closure is effected prior to injection. For this purpose, the hydraulic cylinder 1 is actuated to stretch the inner member 12 of each tie bar by $\Delta L$. The opposite ends of the member 12 having the smaller modulus of elasticity are fastened to the stationary platens 10 and 6. Then, the adjusting nut 14 on the member 12 having the smaller modulus of elasticity comes into contact with the stopper nut 15 mounted on the outer member 11 having the larger modulus of elasticity. When the injection step is started, the injection nozzle 9 produces a high pressure inside the cavity 7. This pressure is received by these two members 11 and 12 of different moduli of elasticity. As a result, the apparent modulus of elasticity increases. The turning point at which one modulus of elasticity is switched to the other larger can be set at will by adjusting the gap $\Delta l_1$ with the nuts 14 and 15 mounted on the members 12 and 11, respectively.

When an optical disk substrate having a diameter of 130 cm and a thickness of 1.2 cm was molded, the tie bars behaved in the manner described below. The member 12 of each tie bar was designed to stretch by 100 microns when subjected to a load of 10 tons. The primary clamping step of mold closure was performed with a force of 3 tons. At this time, the nuts 14 and the stoppers 15 on the four tie bars were so set that $\Delta L$ became null. Subsequently, the nozzle 9 injected molten polycarbonate resin at a temperature of 320° C. at a pressure of 240 Kg/cm$^2$ so that the parting surfaces 16 of the molds 4 and 5 became apart from each other by 30 microns, i.e., the mold opened. At this time, the injection energy was stored in the form of elongation of the tie bar members 11 and 12.

Thereafter, the gate 31 sealed. As the disk 7a molded inside the cavity 7 cooled, a compressing force due to the elongated tie bar members 11 and 12 was exerted on the disk being cooling in the cavity to bring $\Delta L$ to zero. The molded optical disk 7a had spiral grooves whose width was 0.8 micron, the depth of each groove being 0.01 micron. The double refraction index of the optical disk was less than 12 nm at a frequency at which information is written to the disk. The depth of the grooves was 0.098 to 0.099 micron. Thus, the disk substrate was molded quite accurately.

As described above, an important feature of the invention lies in the use of tie bars whose apparent modulus of elasticity increases rapidly after a certain elongation is reached. This permits a compressing force to be applied to the cavity while maintaining the parallelism of the cavity if the platens and the molds have somewhat low degrees of parallelism. Hence, optical disks and lenses which are required to be fabricated to tolerances of the submicron order can be molded satisfactorily. Since the modulus of elasticity of the tie bars and its turning point can be set at will, it is possible to accommodate any desired compressing force and any amount of opening ($\Delta L$) of the mold by appropriately selecting the moduli of elasticity of the two members 11 and 12 of each tie bar and their thicknesses even if parts having different thicknesses or requiring different amounts of contraction are molded. Therefore, the injection molding apparatus is quite simple in structure and does not need any hydraulic control circuit that is complex in structure and expensive. Consequently, the apparatus is capable of molding plastic parts stably and reliably.

The material of the components of the molding apparatus is not limited to steel. For example, the member 12 of each tie bar can be made from a plastic which has a small modulus of elasticity and a large elastic limit. Also, the structure of each tie bar is not restricted to one consisting of a hollow member and a second member inserted in the hollow member. For instance, the tie bar may consist of two parallel cylindrical or prismatic members.

What is claimed is:

1. A method of molding plastic, comprising the steps of:
   injecting a plastic material into a mold at a high pressure in such a way that the energy of the high pressure is stored in the form of elongation of the tie bars along which the mold move in an injection molding apparatus;
   sealing a gate in the mold; and
   then cooling the plastic material in the mold and, at the same time, causing a restoring force of the tie bars due to elastic deformation thereof to act on the mold and thereby the plastic material in the mold as a compressing force for compression molding the plastic material.

2. A method as set forth in claim 1, wherein a length, thickness and modulus of elasticity of a material of the tie bars are determined from a relation between a volumetric coefficient of contraction of the plastic material and a volume of the mold in such a way that the tie bars yield to the high pressure and stretch by a specific length immediately before completion of the injection.

3. An injection compression molding apparatus for molding plastic, comprising:
   a mold;
   an injection unit; and
   tie bars along which the mold moves each of which consists of a first member and a second member having a modulus of elasticity less than that of the first member,
   wherein the modulus of elasticity of each of the tie bars increases rapidly after a certain elongation is reached, an energy of a high pressure transmitted to the mold by the injection unit being stored in the form of elongation of the tie bars, whereby as a molten resin in the mold cools, solidifies and contracts, the tie bars exert a compressing force on the resin.

4. An injection compression molding apparatus as set forth in claim 3, wherein the first member of larger modulus of elasticity is hollow, and wherein the second member of smaller modulus of elasticity is mounted in the hollow inside of the first member.

5. An injection compression molding apparatus for molding plastic, comprising:
- a pair of stationary platens connected together by elongatable tie bars each of which has a small modulus of elasticity when it is elongated within a specific length and a large modulus of elasticity when it is elongated more than the specific length;
- a movable platen capable of moving along the tie bars;
- a stationary mold fixed to one of the stationary platens;
- a movable mold fixed to the movable platen;
- a clamping means for moving the movable platen to shift the movable mold; and
- an injection nozzle for injecting a molten resin into a cavity between the molds.

6. An injection compression molding apparatus as set forth in claim 5, wherein each of the tie bars comprises:
- a first member having a small modulus of elasticity, opposite ends of the first member being fixed to the stationary platens;
- a second member having a large modulus of elasticity, one end of the second memer being fixed to one of the stationary platens; and
- a means which when the first member stretches by a specific length, acts to connect together the first and second members.

7. An injection compression molding apparatus as set forth in claim 6, wherein the second member is hollow, and wherein the first member is mounted in the hollow inside of the second member.

8. An injection compression molding apparatus for molding plastic, comprising:
- a pair of front and rear stationary platens connected together by tie bars each being capable of elongating, each of the tie bars having a small modulus of elasticity when elongated within a specific length and a large modulus of elasticity when elongated more than the specific length;
- a movable platen capable of moving along the tie bars;
- a pair of stationary and movable molds forming therebetween a cavity, the stationary mold being fixed to the front stationary platen, the movable mold being fixed to the movable platen;
- a clamping means for moving the movable platen to move the movable mold toward the stationary mold until parting surfaces of the stationary and movable molds are in contact with each other; and
- an injection nozzle for injecting a molten resin into the cavity between the molds at a high pressure,
- wherein each of the tie bars is elongated by the specific length before the molten resin is injected into the cavity, and further elongates due to the high pressure of the injected molten resin, the further elongated tie bars exerting a compressing force due to their restoring force on the resin in the cavity as the resin cools.

9. An injection compression molding apparatus as set forth in claim 8, wherein each of the tie bars comprises:
- a first member having a small modulus of elasticity and being fixed at both ends thereof to the stationary platens;
- a second member fixed at one end thereof to one of the stationary platens; and
- a means for connecting the first and second members when the first member is elongated by the specific length so as to increase the modulus of elasticity of each tie bar.

10. An injection compression molding apparatus as set forth in claim 9, wherein the second member is a hollow cylindrical member, and the first member is disposed within the second member.

11. An injection compression molding apparatus as set forth in claim 10, wherein said means for connecting the first and second members comprises members mounted on the first and second members, respectively, abuttable against each other when the first member is elongated by the specific length.

12. An injection compression molding apparatus for molding plastic, comprising:
- a mold;
- an injector unit; and
- elongatable tie bars along which the mold moves for storing energy of high pressure transmitted to the mold by the injection unit in the form of elongation of the tie bars, said tie bars having a structure so as to provide of elasticity which increases rapidly when the elongation of each of the tie bars exceeds a predetermined elongation.

* * * * *